(12) United States Patent
Ye et al.

(10) Patent No.: US 10,862,605 B2
(45) Date of Patent: Dec. 8, 2020

(54) DISCOVERY REFERENCE SIGNALING FOR DYNAMICALLY-TIMED TRANSMISSIONS

(71) Applicant: Apple Inc., Cupertino, CA (US)

(72) Inventors: Qiaoyang Ye, Fremont, CA (US); Hwan-Joon Kwon, Santa Clara, CA (US); Seunghee Han, San Jose, CA (US); Abhijeet Bhorkar, Fremont, CA (US); Jeongho Jeon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/770,853

(22) PCT Filed: Apr. 1, 2016

(86) PCT No.: PCT/US2016/025608
§ 371 (c)(1),
(2) Date: Apr. 25, 2018

(87) PCT Pub. No.: WO2017/074496
PCT Pub. Date: May 4, 2017

(65) Prior Publication Data
US 2018/0331774 A1    Nov. 15, 2018

Related U.S. Application Data

(60) Provisional application No. 62/246,264, filed on Oct. 26, 2015.

(51) Int. Cl.
*H04J 11/00* (2006.01)
*H04W 16/10* (2009.01)
(Continued)

(52) U.S. Cl.
CPC ........ *H04J 11/0069* (2013.01); *H04W 16/10* (2013.01); *H04W 16/14* (2013.01);
(Continued)

(58) Field of Classification Search
None
See application file for complete search history.

(56) References Cited

U.S. PATENT DOCUMENTS

2012/0294173 A1\* 11/2012 Su .................. H04W 24/10
370/252
2015/0264592 A1    9/2015 Novlan et al.
(Continued)

FOREIGN PATENT DOCUMENTS

WO    WO-2017074496 A1    5/2017

OTHER PUBLICATIONS

3GPP TS 36.211 v12.2.0, Jun. 2014 (Year: 2014).\*
(Continued)

*Primary Examiner* — Jay L Vogel
(74) *Attorney, Agent, or Firm* — Kowert, Hood, Munyon, Rankin & Goetzel, P.C.

(57) ABSTRACT

A base station for secondary-cell (S-cell) operation in an unlicensed band is subject to listen-before-talk (LBT) rules. The apparatus generates S-cell discovery reference signal (DRS) that includes a primary synchronization signal (PSS) based on a cell ID associated with the base station, a secondary synchronization signal (SSS), a cell-specific reference signal (CRS), and optionally CSI-RS. Solutions are described for generating portions of the DRS to accommodate the placement of the DRS in arbitrary subframes.

20 Claims, 9 Drawing Sheets

(51) Int. Cl.
*H04W 16/14* (2009.01)
*H04W 16/32* (2009.01)
*H04W 74/08* (2009.01)

(52) U.S. Cl.
CPC ........ *H04W 16/32* (2013.01); *H04J 2211/005* (2013.01); *H04W 74/0808* (2013.01)

(56) References Cited

U.S. PATENT DOCUMENTS

| | | | | |
|---|---|---|---|---|
| 2016/0073366 | A1* | 3/2016 | Ng | H04W 56/001 370/329 |
| 2018/0242374 | A1* | 8/2018 | Harada | H04W 16/14 |
| 2018/0249467 | A1* | 8/2018 | Zheng | H04W 56/0005 |

OTHER PUBLICATIONS

"Discussion on LAA DRS design", CMCC, R2-153209, 3GPP TSG RAN WG2 Meeting #91, Beijing, China, (Aug. 13, 2015), 1-4.

"DRS design and LBT procedure", Samsung R I-154143, 3GPP TSG RAN WG1 Meeting #82, Beijing, China, (Aug. 15, 2015), 1-5.

"DRS design for LAA", Panasonic, RI-154018, 3GPP TSG RAN WG1 Meeting #82, Beijing, China,, (Aug. 14, 2015), 1-6.

"DRS design in LAA", LG Electronics RI-154264, 3GPP TSG RAN WG1 Meeting #82, Beijing, China,, (Aug. 15, 2015), 1-4.

"International Application Serial No. PCT/US2016/025608, International Search Report dated Aug. 9, 2016", 3 pgs.

"International Application Serial No. PCT/US2016/025608, Written Opinion dated Aug. 9, 2016", 8 pgs.

"European Application Serial No. 16860411.4, Extended European Search Report dated May 17, 2019", 10 pgs.

LG Electronics, "DRS design in LAA", 3GPP Draft; RI-155387 DRS Design, 3rd Generation Partnership Project (3GPP), Mobile Competence Centre ; 650, Route Des Lucioles ; F-06921 Sophia-Anti Polis Cedex; France vol. RAN WG1, No. Malmö, Sweden, Retrieved from the Internet: <URL:http ://www.3gpp.org/ftp/Meetings3GPPSYNC/RAN1/Docs/> [retrieved on Oct. 4, 2015], (Oct. 4, 2015), 11 pgs.

* cited by examiner

US 10,862,605 B2

DISCOVERY REFERENCE SIGNALING FOR DYNAMICALLY-TIMED TRANSMISSIONS

PRIORITY CLAIM

This application is a U.S. National Stage Application under 35 U.S.C. 371 from International Application No. PCT/US2016/025608, filed Apr. 1, 2016, which claims the benefit of priority to U.S. Provisional Application No. 62/246,264, filed Oct. 26, 2015, the disclosure of each of which are incorporated herein by reference herein in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 5G networks, although the scope of the applicability is not limited in this respect. Some embodiments relate to discovery reference signal generation, particularly for use with license-assisted access (LAA) operation for small cells.

BACKGROUND

Long Term Evolution (LTE) cellular data networks are making increasing usage of low-powered radio access nodes called small cells. Unlike macrocells, which may have a communication range up to tens of kilometers, small cells have communication ranges of between tens of meters to 1 or 2 kilometers. Types of small cells include microcells, picocells, and femtocells. These are oftentimes operated as secondary cells within a macrocell to provide additional capacity in areas that are dense with user equipment devices (UEs), or to provide coverage in areas that macrocells may have difficulty reaching, such as low-lying areas or areas that other suffer from reduced signal strength due to natural or man-made obstructions. When a small cell is not actively serving any UEs, it may transition from an active ON state to an inactive OFF state. During the OFF state, the small cell periodically transmits a discovery reference signal (DRS) that UEs may use to find, and connect with, the small cell.

There is an increasing demand for high data rates over wireless, but the usable licensed spectrum is physically limited. As a result, it has been proposed to extend the operation of LTE systems into the unlicensed spectrum. For instance, LTE License-Assisted Access (LAA) is being considered by the Third-Generation Partnership Project (3GPP), a standard-setting organization for LTE. The unlicensed frequency band of current interest in 3GPP is the 5 GHz band, which offers a wide spectrum with common global availability. The main incumbent system in the 5 GHz band is the Wireless Local Area Network (WLAN), specifically those based on the IEEE 802.11 a/n/ac technologies. Since WLAN systems are widely deployed both by individuals and operators for carrier-grade access service and data offloading, sufficient care must be taken before LTE may be deployed in this band. Listen-Before-Talk (LBT) operation is generally considered as an essential feature of LAA systems for fair coexistence with the incumbent system. LBT is a procedure whereby radio transmitters first sense the communication channel, and transmit only if the channel is found to be idle.

The LBT accommodation presents some challenges to certain LTE LAA operations. For example, the DRS transmission in the unlicensed spectrum, being also subject to the LBT requirement, may not work as intended to allow UEs to connect with the small cell, possibly resulting in poor small-cell LAA performance.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
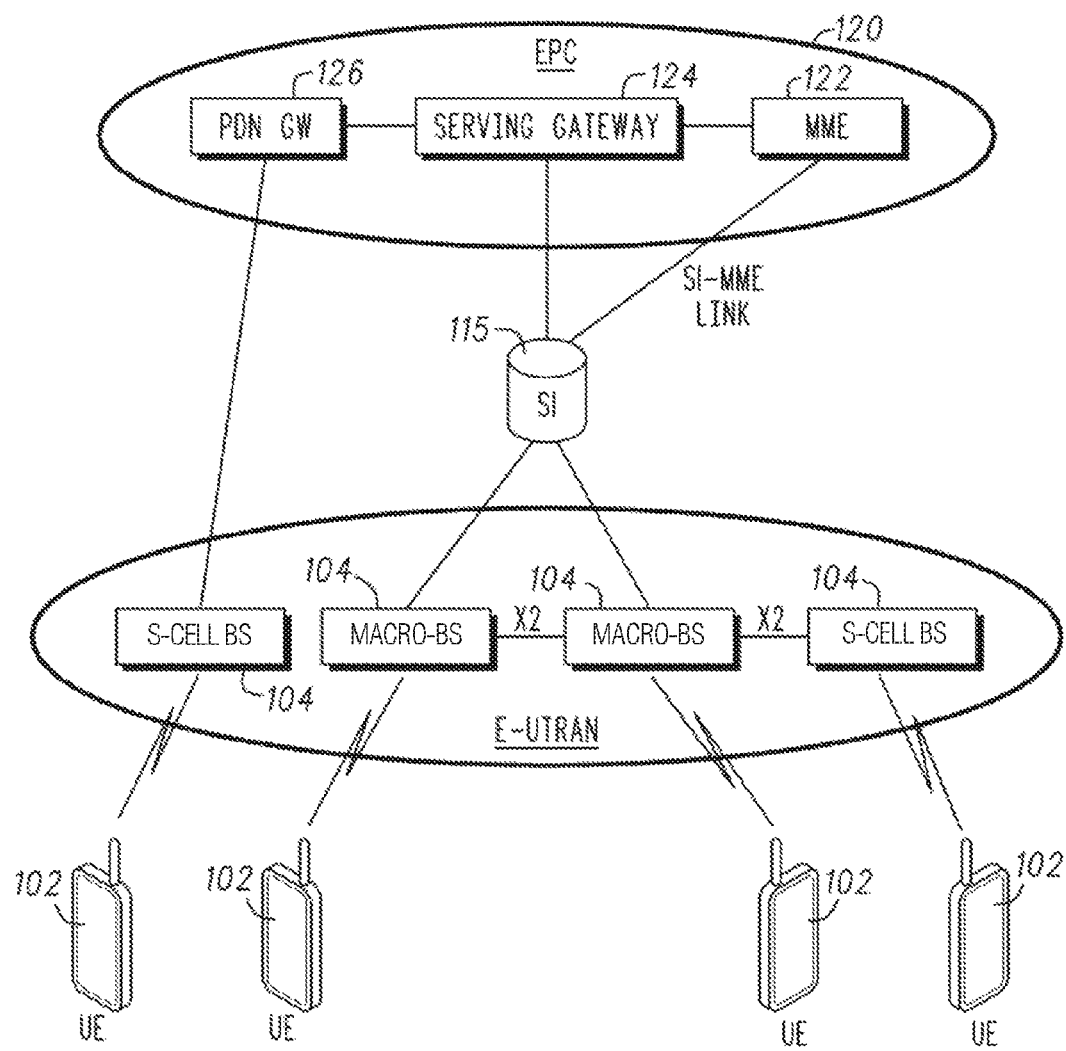
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity sake, only a portion of the core network 120, as well as the RAN 101, is shown.

The core network 120 includes a mobility management entity (MME) 122, a serving gateway (serving GW) 124, and packet data network gateway (PDN GW) 126. The RAN 101 includes base stations (BSs) 104, which may implement Evolved Node-Bs (eNBs) (or portions thereof), as well as secondary cells. As depicted, base-stations 104 may include macro base-stations, and secondary-cell (S-CELL) base stations for communicating with User Equipment (UE) 102. In accordance with some embodiments, the BS 104 may transmit a downlink control message to the UE 102 to indicate an allocation of physical uplink control channel (PUCCH) channel resources. The UE 102 may receive the downlink control message from the BS 104, and may transmit an uplink control message to the BS 104 in at least a portion of the PUCCH channel resources. These embodiments will be described in more detail below.

In related embodiments, a base station may be incorporated an eNB

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The BSs 104 (macro and micro) terminate the air interface protocol and may be the first point of contact for a UE 102. In some embodiments, an eNB (which may be implemented with one or more BSs 104) may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with a BS 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 101 and the EPC 120. It is split into two parts: the S1-U, which carries traffic data between the BSs 104 and the serving GW 124, and the S1-MME, which is a signaling interface between the BSs 104 and the MME 122. The X2 interface is the interface between BSs 104. The X2 interface comprises two parts, the X2-C and X2-U. The X2-C is the control plane interface between the BSs 104, while the X2-U is the user plane interface between the BSs 104.

With cellular networks, LP cells are typically used to extend coverage to indoor areas where outdoor signals do not reach well, or to add network capacity in areas with very dense phone usage, such as train stations. As used herein, the term low power (LP) BS refers to any suitable relatively low power BS for implementing a narrower cell (narrower than a macro cell) such as a femtocell, a picocell, or a micro cell. Femtocell BSs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP BS might be a femtocell BS since it is coupled through the PDN GW 126. Similarly, a picocell is a wireless communication system typically covering a small area, such as in-building (offices, shopping malls, train stations, etc.), or more recently in-aircraft. A picocell BS can generally connect through the X2 link to another BS such as a macro BS through its base station controller (BSC) functionality. Thus, LP BS may be implemented with a picocell BS since it is coupled to a macro BS via an X2 interface. Picocell BSs or other LP BSs may incorporate some or all functionality of a macro BS. In some cases, this may be referred to as an access point base station or enterprise femtocell.

In some embodiments, a downlink resource grid may be used for downlink transmissions from a BS 104 to a UE 102, while uplink transmission from the UE 102 to the BS 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the BS 104 based on channel quality information fed back from the UEs 102 to the BS 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term circuitry may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware or software.

Figure 2:
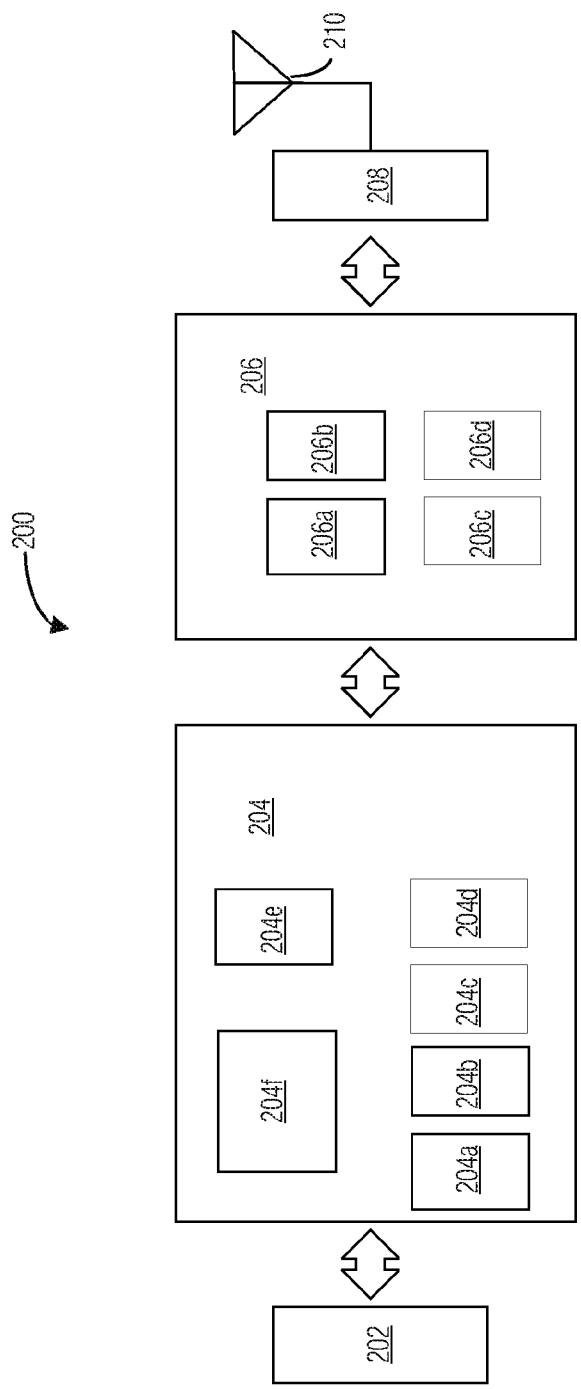
FIG. 2 is a block diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and one or more antennas 210, coupled together at least as shown. In some embodiments, other circuitry or arrangements may include one or more elements or components of the application circuitry 202, the baseband circuitry 204, the RF circuitry 206 or the FEM circuitry 208, and may also include other elements or components in some cases. As an example, "processing circuitry" may include one or more elements or components, some or all of which may be included in the application circuitry 202 or the baseband circuitry 204. As another example, "transceiver circuitry" may include one or more elements or components, some or all of which may be included in the RF circuitry 206 or the FEM circuitry 208. These examples are not limiting, however, as the processing circuitry or the transceiver circuitry may also include other elements or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the system.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/remapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 204e of the baseband circuitry 204 may be configured to run elements of the protocol stack for signaling of the PHY, MAC, and RLC, PDCP or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into ND equal packets of phase, where ND is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, or input/output (I/O) interface.

Figure 3:
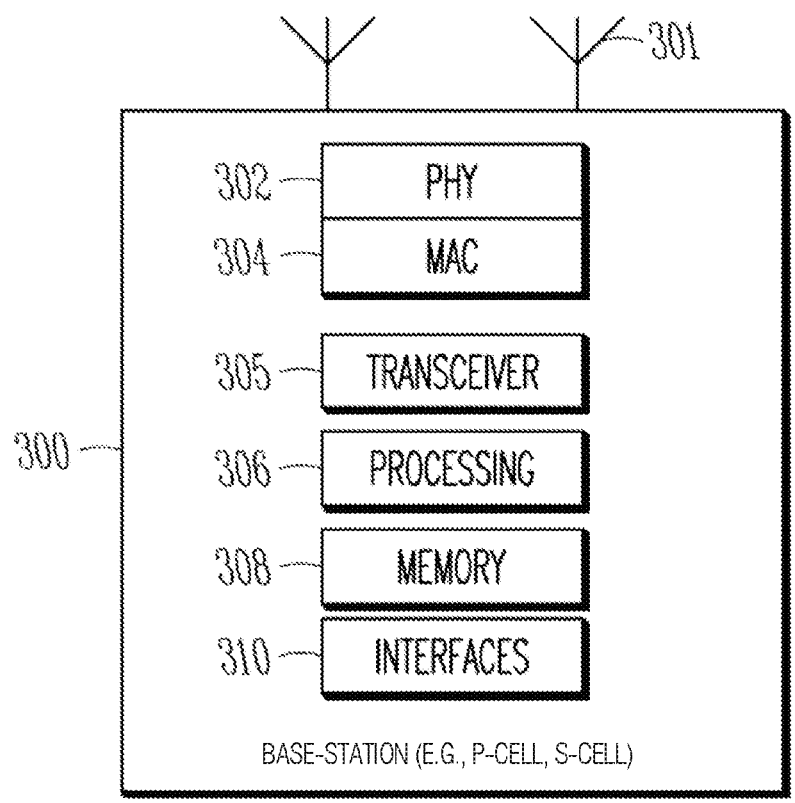
FIG. 3 is a block diagram illustrating a base-station in accordance with some embodiments.

FIG. 3 is a functional diagram of a base station (BS) in accordance with some embodiments. It should be noted that in some embodiments, the BS 300 may be a stationary non-mobile device. BS 300 may operate as a primary cell (P-cell) or secondary cell (S-cell) according to its designed attributes or configuration. The BS 300 may be suitable for use as a BS 104 as depicted in FIG. 1. The BS 300 may include physical layer circuitry 302 and a transceiver 305, one or both of which may enable transmission and reception of signals to and from the UE 200, other BSs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The BS 300 may also include medium access control layer (MAC) circuitry 304 for controlling access to the wireless medium. The BS 300 may also include processing circuitry 306 and memory 308 arranged to perform the operations described herein. The BS 300 may also include one or more interfaces 310, which may enable communication with other components, including other BSs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210, 301 may be effectively separated to take advantage of spatial diversity and the different channel characteristics that may result.

In some embodiments, the UE 200 or the BS 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive or transmit information wirelessly. In some embodiments, the UE 200 or BS 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, BS 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the BS 300 are each illustrated as having several separate functional elements, one or more of the functional elements may be combined and may be implemented by combinations of software-configured elements, such as processing elements including digital signal processors (DSPs), or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 or BS 300 may include various components of the UE 200 or the BS 300 as shown in FIGS. 2-3. Accordingly, techniques and operations described herein that refer to the UE 200 (or 102) may be applicable to an apparatus for a UE. In addition, techniques and operations described herein that refer to the BS 300 (or 104) may be applicable to an apparatus for a BS.

As the demand for communicating data (e.g., voice and video) has continued to increase, a RAN may experience increasingly heavy communication traffic. This can lead to adverse network effects such as reduced data rates. To alleviate network traffic on the licensed spectrum, network capacity can be added by providing communication capability to the RAN devices from networks that operate using a communication spectrum not licensed for use by the cellular network devices.

In general, particular resource elements may be used to transmit reference signals (also called pilots) that are known to both the transmitter and receiver. Examples of conventional reference signals that may be supported by LTE include a primary synchronization signal (PSS), a secondary synchronization signal (SSS), non-zero-power CSI-RS and the CRS sent by the cell on a downlink frame. In an active cell, the CRS may be present in all subframes. The PSS and SSS may be used by UEs for cell search and acquisition, and timing synchronization. The PSS and SSS may be transmitted by an eNB on the downlink in the center 1.08 MHz of the system bandwidth for each cell supported by the eNB. In an active cell, the PSS and SSS may be transmitted in symbol periods 6 and 5, respectively, in subframes 0 and 5 of each frame. Specifically, a PSS may be transmitted in the first subframe for an LTE frame structure applicable to FDD operation in the licensed band and to LAA operation, and in the second subframe for an LTE frame structure applicable to TDD operation in the licensed band.

Figure 4A:
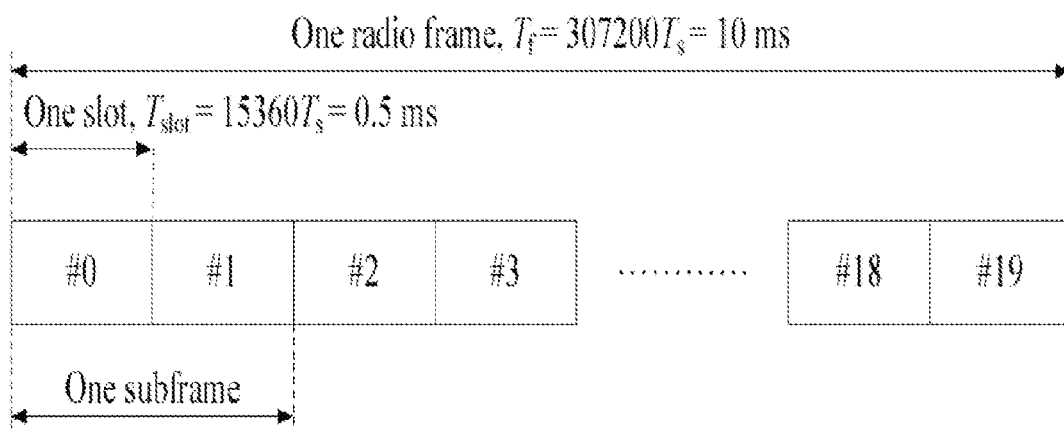
FIG. 4A is a diagram illustrating the frame structure for FDD and LAA secondary cell operation according to some embodiments.

FIG. 4A is a diagram illustrating the frame structure for FDD and LAA secondary cell operation according to some embodiments. Each radio frame is $T_f=307200 \cdot T_s=10$ ms long and is composed s of 20 slots of length $T_{slot}=15360 \cdot T_s=0.5$ ms, numbered from 0 to 19. A subframe is defined as two consecutive slots where subframe i consists of slots 2i and 2i+1.

Figure 4B:
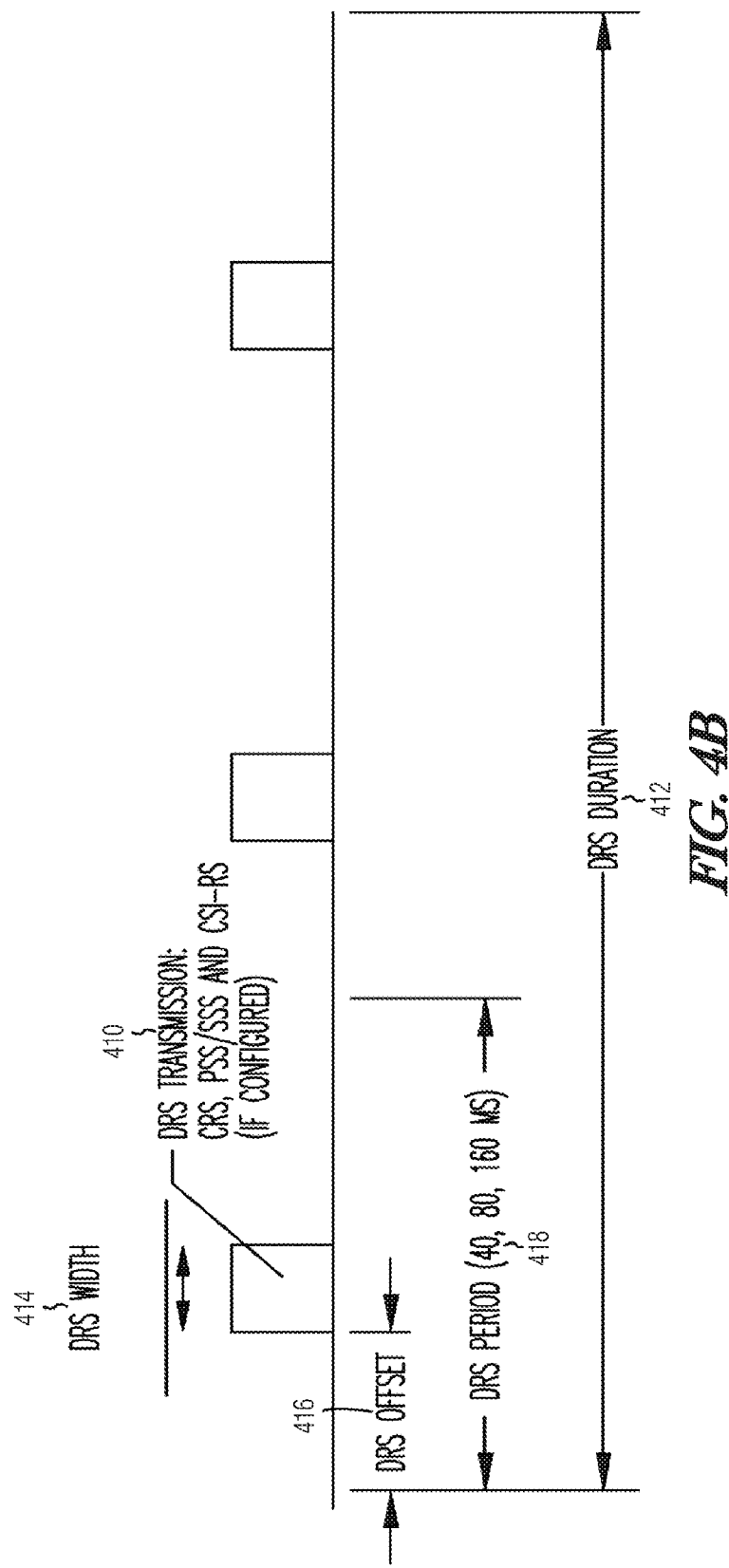
FIG. 4B is a diagram illustrating a discovery reference signal in accordance with some embodiments.

Release 12 of the 3GPP specifications, (hereinafter, "Rel-12") introduced discovery reference signals (TS 36.211 v12.4.0, Section 6.11). FIG. 4B is a diagram illustrating a discovery reference signal in accordance with some embodiments. In a discovery reference signal-based procedure, the UE can be configured by the E-SMLC with at least one discovery reference signal measurement timing configuration (DMTC) per frequency (used by each cell) by the serving or neighboring eNB. The DMTC may indicate the timing of when the UE may perform cell detection and RRM or positioning measurement based on the discovery reference signal. The DMTC may include period and offset (derived from the dmtc-PeriodOffset information element as defined in Rel-12) and duration with respect to timing of the primary serving cell timing (from the durationFDD or durationTDD information element both as defined in Rel-12) of the discovery signal.

The discovery reference signal depicted in FIG. 4B may include a PSS/SSS, a CRS, and multiple channel state information reference signal (CSI-RS) resource element (RE) configurations. The CSI-RS configurations may be in the same subframe or be in different subframe(s). As illustrated in FIG. 4B, a discovery reference signal for a cell may comprise a predetermined width 414. Legacy systems define the width 414 to be less than or equal to 5 ms, though in LAA embodiments the width may be defined as less than or equal to 1 ms. A predetermined duration 412 of N consecutive subframes is defined, where N may be N=durationFDD or N=durationTDD. The discovery reference signal may be transmitted by each cell over a predetermined period 4188 of every M ms (where M is 40, 80, 160). M may be derived from the dmtc-PeriodOffset information element. The location server or serving eNB may determine the discovery reference signal characteristics of period and duration based on, for example, UE and environmental characteristics as determined (and perhaps saved) at the location server and/or serving eNB.

In addition, the non-zero power CSI-RS signals may be scrambled independently. The Rel-12 scramblingIdentity parameter may define the pseudo-random sequence modulating the CSI-RS signal. In particular, the discovery reference signal configuration may include signaling of non-zero-power CSI-RS parameters using the MeasCSI-RS-Config Rel-12 information element. In the discovery reference signal, the relative subframe offset 306 between the SSS and CSI-RS configuration may be variable or fixed within some specified duration relative to the subframe containing the SSS. The relative subframe offset 416 is defined by subframeOffset as defined in Rel-12.

The SSS may be transmitted in the first subframe. A non-zero-power CSI reference signal (CSI-RS) may be used to obtain channel state information (CSI) for the downlink channel to assist transmission parameter selection at the eNB. The non-zero power CSI-RS may be transmitted periodically in the downlink subframes with a configurable period of, for example, 5, 10, 20, 40 and 80 ms.

The CRS is a reference signal that may be specific for a cell, e.g., generated based on a cell identity (ID). The CRS may be used for different purposes, including RRM measurements. For eNBs with multiple antennae, the same cell specific reference signal may be transmitted from each downlink antenna port. Different eNBs may transmit their cell specific reference signals on the same or different evenly spaced subcarriers, depending on their cell IDs. The CRS may be transmitted in preset symbol periods of each downlink subframe or a downlink pilot time slot (DwPTS) region of subframes. The DwPTS may be transmitted subframes 1 and 6 (depending on the uplink/downlink configuration) with a length that depends on the cell size. The CRS may be used by the UEs for cell search and initial acquisition or to perform, among others, channel quality measurements and channel estimation for coherent demodulation/detection. The CRS and PSS/SSS may be transmitted in the same subframe(s).

The discovery reference signal may support synchronization and Radio Resource Management (RRM) measurement for small cells. In Rel-12 12 of the 3GPP specifications, small cells may operate in both an "on" or active state or an "off" or dormant state. This may permit a small cell to become dormant when unneeded, thereby decreasing interference in neighboring small cells that is generated by the small cell.

In the active state, the small cells may operate normally, sending downlink control signals such as the PSS, SSS, CRS, and optionally CSI-RS to the UEs served by the small cells. The dormant state may be a sleep or other low power state in which transmissions from the small cells are limited. In particular, in the dormant state, a small cell may not send the normal reference signals in the same manner to the UEs served by the small cell. This may be a particular issue in small cells that operate in an unlicensed LTE band in which the cells provide LTE communications and should coexist with other incumbent technologies such as WiFi. The small cells may enter the dormant state to save power and keep the spectrum clear to reduce interefence with other existing networks, such as WiFi networks, or to avoid creating interference in neighboring small cells if there are no UEs to be served by the small cell.

The DRS was designed to facilitate a fast transition from OFF state to ON state by transmitting minimal signals for RRM measurement during the small cell's OFF state. DRS measurement timing configuration (DMTC) is configured by the eNB, which has occasion of 6 ms and periodicity of 40 ms, 80 ms or 160 ms. In other words, regardless of the configured periodicity, there is a 6 ms window during which the DRS may be transmitted.

The UEs normally expect DRS to be received only within DMTC. The DRS according to Release 12 is composed primary of the synchronization signal (PSS), secondary synchronization signal (SSS), cell-specific reference signal (CRS) and, optionally, the channel state information reference signal (CSI-RS).

The PSS in the frequency domain is a length-62 sequence, which is generated from the Zadoff-Chu sequence of length 63, with the middle element punctured to avoid transmission on the DC subcarrier. There are 3 potential sequences, and the selection from the 3 sequences is based on the cell ID.

Figure 5:
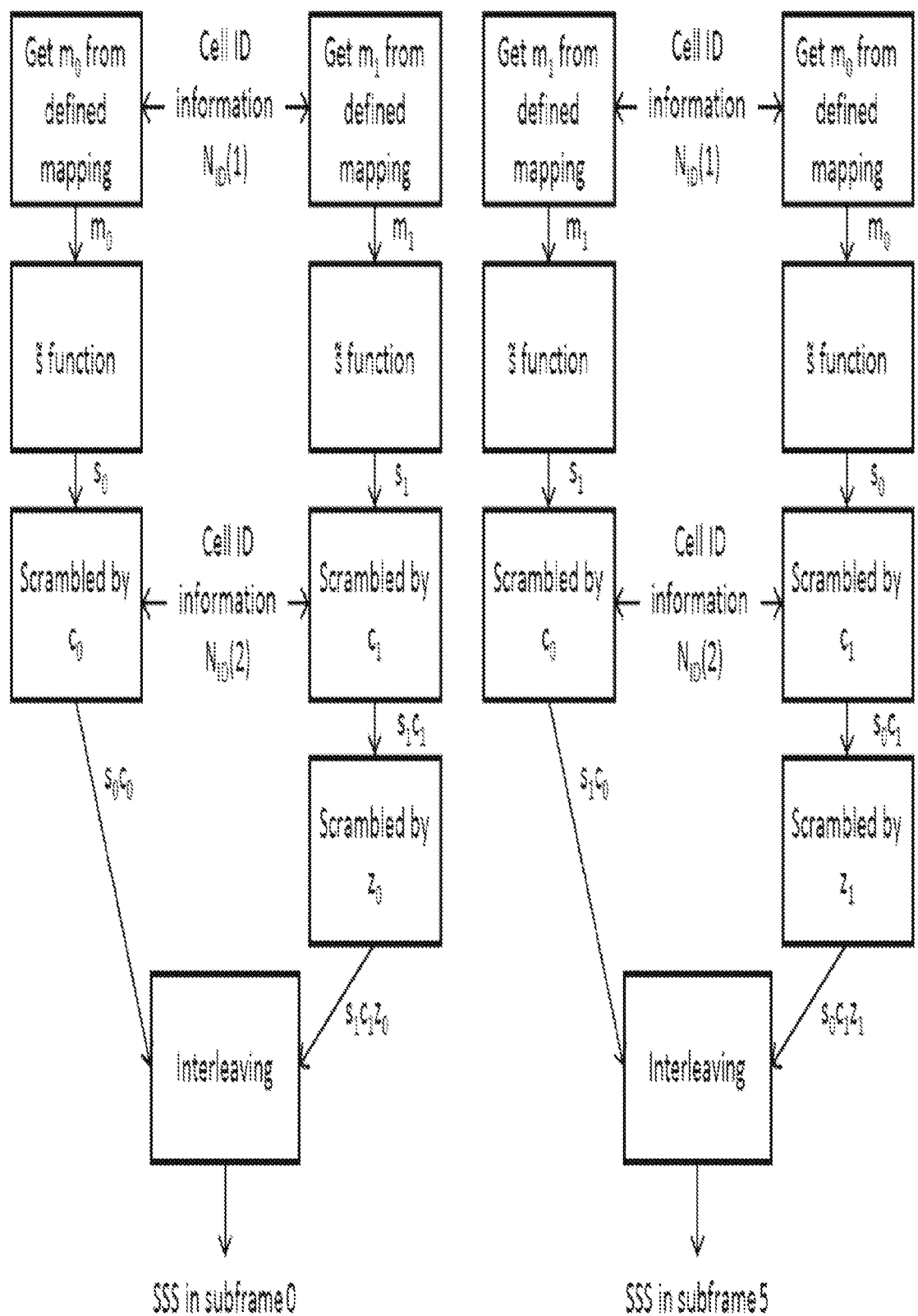
FIG. 5 is a flow diagram illustrating generation of the SSS for use with LAA LTE systems according to 3GPP Release 12.

FIG. 5 is a flow diagram illustrating generation of the SSS for use with LAA LTE systems according to Rel-12. The SSS is generated in the frequency domain by interleaving two length-31 secondary synchronization codes (SSCs), which are generated from two maximum-length sequences (M-sequences). As illustrated, within each radio frame, SSS is transmitted only in subframes #0 and #5. The two SSCs are swapped in the generation of SSS transmitted in subframes #0 and #5, which enables the differentiation in subframe indexes. Specifically, the SSS is generated according to the following expressions:

$$d(2n) = \begin{cases} s_0(n)c_0(n) & \text{in subframe } 0 \\ s_1(n)c_0(n) & \text{in subframe } 5 \end{cases}$$

and

-continued $$d(2n+1) = \begin{cases} s_1(n)c_1(n)z_0(n) & \text{in subframe 0} \\ s_0(n)c_1(n)z_1(n) & \text{in subframe 5} \end{cases}$$

where $s_k(n)=\tilde{s}((n+m_k) \bmod 31)$, $c_k(n)=\tilde{c}((n+\text{NID}(2)+3 \; k) \bmod 31)$, $z_k(n)=\tilde{z}((n+(m_k \bmod 8)) \bmod 31)$, $n\in\{0, 1, \ldots, 30\}$ and $k\in\{0, 1\}$, with $\tilde{s}(n)$, $\tilde{c}(n)$ and $\tilde{z}(n)$ being 3 different predefined M-sequences of length 31, $\text{NID}(2) \in\{0, 1, 2\}$ being the physical-layer identity within the cell identity group, and $m_k\in\{0, 1, \ldots, 30\}$ being indexes derived from a given mapping between the cell identity group $\text{NID}(1) \in\{0, 1, \ldots, 167\}$ and $\{m_0, m_1\}$.

Each of the two SSS (i.e., SSS transmitted in subframes #0 and #5) has 168 candidate sequences, and the selection from these potential sequences is based on cell ID.

Each of the CRS and the CSI-RS is generated from pseudo-random sequences, which are in turn generated from a length-31 Gold sequence. The pseudo-random sequences used in CRS generation are reinitialized at the start of each OFDM symbol, with a value depending on the cell ID, CP type, slot number within a radio frame and the OFDM symbol number within the slot. CSI-RS has the same generation method as CRS, except that the initialization value depends on CSI ID instead of cell ID. The CSI ID equals cell ID, unless it is configured by higher layers to be different from cell ID.

Notably, from the above summary, the sequence generations of SSS and RS depend on the subframe index, and SSS is transmitted only in subframes #0 and #5 in legacy LTE systems. To improve the performance of DRS-related operations (e.g., time-frequency synchronization and RRM measurement accuracy), it has been proposed to allow the DRS to be transmitted in at least one of the different time positions within the configured Discovery Measurement Timing Configuration (DMTC) in LAA systems, so as to increase the transmission opportunities of DRS in the unlicensed spectrum. Note that these DRS transmissions are subject to LBT. Therefore, in the unlicensed spectrum, the DRS can be transmitted in subframes that are different from subframes #0 and #5.

Figure 6:
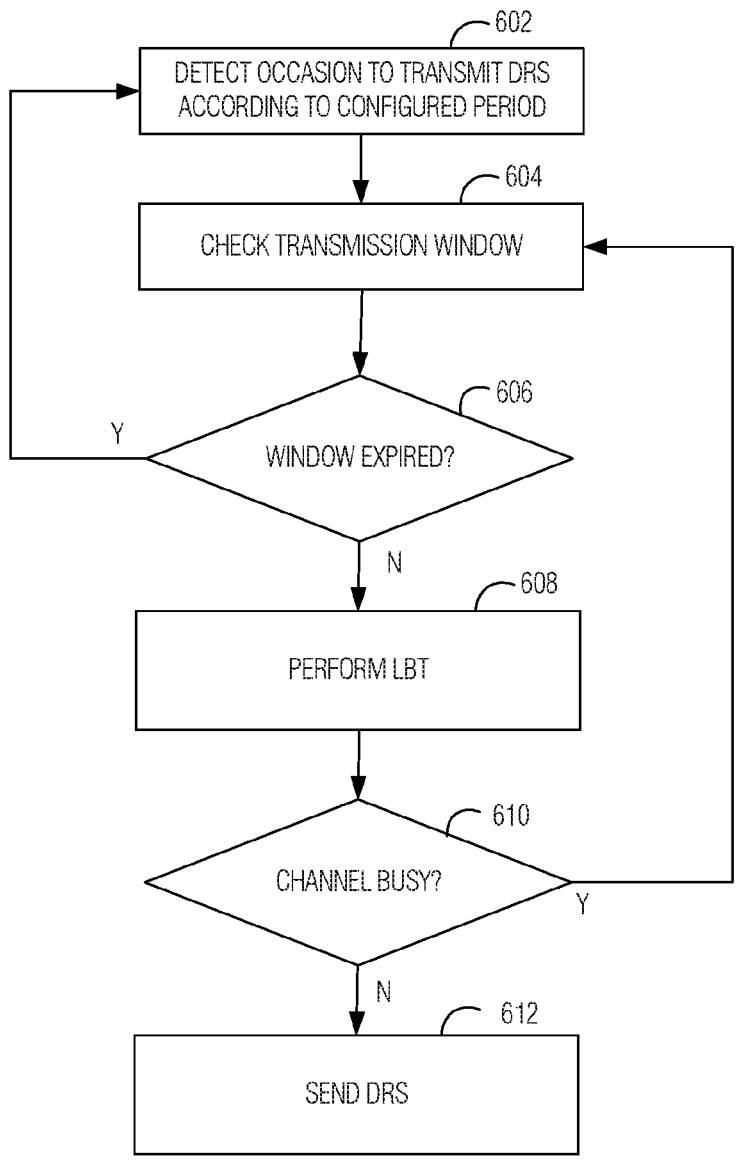
FIG. 6 is a flow diagram illustrating an example process of operation of a secondary cell BS as it determines whether to transmit a DRS by according to some embodiments.

FIG. 6 is a flow diagram illustrating an example process of operation of a secondary cell BS as it determines whether to transmit a DRS by according to some embodiments. The process may be executed by the secondary cell BS as part of a LAA operating regime. At 602 the BS detects an occasion to transmit a DRS. The occasion may be at the expiration of a configured period. At 604, the BS checks the applicable transmission window, which may be 6 ms, for instance, during which the DRS transmission is permitted in the current period. If the transmission window is expired, as determined at decision 606, the process loops back to block 602 to wait for the next occasion. Otherwise, the process advances to operation 608, where the BS performs the listen-before-talk operation. Accordingly, if the channel is busy, decision 610 directs the process flow to operation 604 to check the transmission window and, if time is available, to try again. Otherwise, decision 610 advances the process to operation 612 to send the DRS. In various embodiments, the duration of the DRS is at most 1 ms (which is reduced from the 5-ms limit of legacy systems).

As a result of the process depicted in FIG. 6, which includes the LBT operation, and a reduced-duration DRS, the DRS may be transmitted on any available subframe. This operational feature differs from legacy systems, in which the DRS was temporally fixed to specific subframes, e.g., #0 or #5.

Although the DRS can be transmitted in subframes other than #0 and #5 in the unlicensed spectrum, the SSS is defined only for subframes #0 and #5 in legacy LTE systems. Some aspects of the embodiments recognize, and address, the need for a new SSS generation technique that may be used to generate SSS sequences for transmission in subframes other than #0 and #5 for DRS in the unlicensed spectrum.

Unlike legacy LTE systems, a PCell according to some embodiments may provide additional information to compatible UEs, which may facilitate the LAA operation. For example, LAA-enabled UEs may determine the subframe index by referencing the timing of the PCell, if the PCell and SCell are co-located and synchronized. In this case, there may be no need to generate SSS/CRS/CSI-RS based on the subframe index, which may otherwise cause additional complexity for UEs.

On the other hand, the intention to generate subframe-based sequences would be more motivated in standalone LTE operation on an unlicensed carrier where there is no reference timing information (e.g. from PCell as in LAA). Some embodiments are directed to a new SSS generation technique designed to reflect the subframe index of which the corresponding SSS is transmitted.

According to various embodiments, two types of SSS/CRS generation techniques are provided for DRS in the unlicensed spectrum. The first type of technique according to some embodiments generates SSS/CRS sequences irrespective of the subframe index. This first type of sequence generation technique may be used in the case where the subframe index information is available via other means, e.g., inferring from PCell information, rather than solely relying on the detection of SSS/CRS.

The second type of technique according to related embodiments generates the sequences based on the subframe index. In these embodiments, the subframe index information may be obtained from the SSS/CRS itself, which may be useful when the subframe index information cannot be obtained by any other means (e.g., standalone LTE unlicensed system).

It will be understood that the usage cases described herein are illustrative and not limiting. It is contemplated that there may be a variety of other applicable usage cases for each of the two types of sequence generation embodiments.

Sequence Generation Irrespective of Subframe Index

As stated above, the embodiments in which it is possible for UEs to obtain the subframe index by some way other than the detection of SSS/CRS (e.g., by utilizing the PCell timing if the PCell and SCell are synchronized) makes the option of SSS/CRS generation irrespective of the subframe index practicable. In an example, the SSS/CRS sequences in a DRS transmitted by a SCell can be the same for all subframes.

According to one embodiment, the SSS/CRS sequence that is defined for subframe #0 is used for the DRS transmitted in any subframes in the unlicensed spectrum. In a related embodiment, SSS/CRS sequence defined for subframe #5 is used for the DRS transmitted in any subframe in the unlicensed spectrum.

In one example, this type of approach is employed when the PCell and SCell are synchronized, in which case UEs can refer to the timing of the PCell for the subframe index information of SCell.

In another example, this type of approach is applicable where the subframe index information may be obtained by a payload-based method. For instance, the physical broadcast channel (PBCH) reserved bits may be used to transmit the subframe index information. The number of bits to indicate the subframe index is 4 bits, which is less than the 10 reserved bits in PBCH. The 4-bit information to indicate the subframe index may be transmitted in the DRS itself, particularly in the REs available for DRS transmission that have not been allocated to transmit the PSS/SSS/RS.

Sequence Generation Based on the Subframe Index where DRS is Transmitted in Unlicensed Spectrum According to some embodiments, within a radio frame, SSS/CRS in DRS transmitted in some preconfigured subframes may use Rel-12 SSS/CRS generated for subframe #0, while SSS/CRS in DRS transmitted in other than the preconfigured subframes can use the Rel-12 SSS/CRS generated for subframe #5.

The CRS in Rel-12 may be used, where the generation depends on the subframe index.

A new SSS according to some embodiments can be transmitted in any subframe. The subframe index information in addition to cell ID information may be inserted in the M-sequences $s_k$, where $k \in \{0, 1\}$. For example, new M-sequences $s_{k,j}(n)$ that depend on $m_k$ obtained from a new mapping between the {subframe index, cell ID} and {$m_0$, $m_1$} can be designed, where $k \in \{0, 1\}$, $j=(l \mod 5)$, and $l$ is the subframe index, The subframe index information in addition to cell ID may be inserted in the generation of scrambling sequences $c_k$ with $k \in \{0, 1\}$. For example, new scrambling sequences $c_{k,j}(n)$ with $k \in \{0, 1\}$ and $j=(l \mod 5)$, where $l$ is the subframe index, are provided according to some embodiments. The new scrambling sequences are obtained by cyclic shift of the M-sequence $\tilde{c}(n)$, with the shifting amount not only depends on the cell ID but also depends on the subframe index.

In some embodiments, a SSS generated for subframes other than #0 and #5 as provided according to the above two SSS generation methods, while the SSS generated for subframes #0 and #5 may be the same as the Rel-12 SSS for these two subframes, respectively.

In a related embodiment, the REs used to transmit the SSS may be replaced by modulated symbols carrying data, which include the cell ID information and subframe index information.

In one type of embodiment, the SSS/CRS generation is based on the subframe index where the DRS is transmitted in the unlicensed spectrum. This approach may be considered as a relatively simple extension of the Rel-12 SSS/CRS, where instead of changing the sequence itself, a new mapping for the SSS/CRS sequence and the subframe to transmit the corresponding sequence is provided.

In this embodiment, the subframes within a radio frame can be separated into two sets, X and Y. SSS/CRS in DRS transmitted in subframes belonging to X may use Rel-12 SSS/CRS in subframe #0, while SSS/CRS in DRS transmitted in subframes belonging to Y may use Rel-12 SSS/CRS in subframe #5. X and Y are preconfigured subframe index sets, with $X \cap Y = \emptyset$ and $X \cup Y = \{0, 1, \ldots, 9\}$. In some embodiments, we can let $X=\{0, 1, 2, 3, 4\}$ and $Y=\{5, 6, 7, 8, 9\}$, i.e., the DRS transmitted in subframes from #0 to #4 may use Rel-12 SSS/CRS in subframe #0, and the DRS transmitted in subframes from #5 to #9 may use Rel-12 SSS/CRS in subframe #5.

Note that with this approach, the range of subframe indexes is discernable, but not the exact subframe index. This would not be a problem in LAA where the subframe index can be inferred from the primary carrier (licensed carrier), but may present challenges elsewhere, e.g., in standalone LTE unlicensed operation. An example usage case for this type of embodiment includes the case where the subframe index information can be obtained by other means besides the detection of SSS/CRS/CSI-RS. Moreover, the information on the range of subframe indexes can help reduce the overhead for providing additional subframe index information, if such information is transmitted. The following example represents a related embodiment that utilizes the additional information from the subframe-dependent SSS according to the present embodiment type.

Denote the sets $\{0, 5\}$, $\{1, 6\}$, $\{2, 7\}$, $\{3, 8\}$ and $\{4, 9\}$ by $\{Z0, Z1, Z2, Z3, Z4\}$. In the cases where one element in $Zj$ belongs to X and the other element in $Zj$ belongs to Y for any $j \in \{0, 1, \ldots, 4\}$, e.g., $X=\{0, 1, 2, 3, 4\}$ and $Y=\{5, 6, 7, 8, 9\}$, the subframes are separated into 5 groups: $\{0, 5\}$, $\{1, 6\}$, $\{2, 7\}$, $\{3, 8\}$ and $\{4, 9\}$. Identification of the indexes within each group may rely on a method similar to the differentiation between subframes #0 and #5 in Rel-12 SSS, since the two Rel-12 SSS (transmitted in subframes #0 and #5, respectively) are used for the two elements in each group, respectively.

To identify which group to which the subframe index belongs, this approach may either use the information provided by the PCell if it is given, or the payload based method may be utilized, as described above. The PBCH reserved bits can be used to transmit the subframe index information. The required number of bits to indicate the subframe index is 3 bits, which is less than the 10 reserved bits in PBCH. The 3-bit information to indicate the subframe index may be transmitted in the DRS. For example, the subframe index information may be transmitted in REs for DRS transmission that have not been used to transmit PSS/SSS/RS.

In a related approach according to another embodiment, the CRS/CSI-RS of Rel-12 can be used, where the generation depends on the subframe index.

In another approach, a new SSS is provided that depends on the subframe index. According to one type of embodiment, the subframe index information may be provided from the detection of SSS/CRS/CSI-RS, and can be used in the case where there is no additional side information of the subframe index is available (e.g., in the standalone LTE unlicensed system without subframe index information inserted in places other than SSS/CRS/CSI-RS).

In one example, the Rel-12 SSS generation method is extended to generate subframe-dependent SSS for all subframes. To illustrate, some embodiments of this option are as follows.

In one such embodiment, subframe index information in addition to cell ID information is inserted in the M-sequences $s_k$. Recall that in Rel-12, we have $s_k(n) = \tilde{s}((n+m_k) \mod 31)$, with $k=0$ for sequence in subframe #0 and $k=1$ for sequence in subframe #5. The value of $m_k \in \{0, 1, \ldots, 30\}$ is derived from a given mapping between the cell identity group $NID(1) \in \{0, 1, \ldots, 167\}$ and $\{m_0, m_1\}$. In some embodiments, the M-sequences $s_k$ are changed by defining new M-sequences to generate $s_k$, and new mapping between {cell ID, subframe index} and $\{m_0, m_1\}$.

For instance, new M-sequences $\tilde{s}_k$ are defined that are used to generate $s_k$. For example, let $\tilde{s}_0$ be the M-sequence $\tilde{s}$ used in Rel-12, and $\tilde{s}_1$ be a new M-sequence that has not been used in Rel-12. Letting $\tilde{s}_1(n) = 1 - 2x(n)$, the possible selections of $x(n)$ include:

$$x(n+5) = x(n+4) + x(n+3) + x(n+1) + x(n) \mod 2 \text{ (i.e. } 1+x+x^3+x^4+x^5\text{)},$$

$$x(n+5) = x(n+4) + x(n+3) + x(n+2) + x(n) \mod 2 \text{ (i.e. } 1+x^2+x^3+x^4+x^5\text{)},$$

$$x(n+5) = x(n+3) + x(n+2) + x(n+1) + x(n) \mod 2 \text{ (i.e. } 1+x+x^2+x^3+x^5\text{)},$$

where the initial condition can be $x(0)=x(1)=x(2)=x(3)=0$ and $x(4)=1$. The first primitive polynomial $(1+x+x^3+x^4+x^5)$ may be preferable in some cases given that it has a duality relationship from the existing primitive polynomial (1+x^2+x^4+x^5), which may show a better cross-correlation property.

As another approach, the subframes may be separated into 5 groups: {0, 5}, {1, 6}, {2, 7}, {3, 8} and {4, 9}.

As yet another approach, a new mapping between the {subframe group index, cell ID} and {$m_0$, $m_1$} is defined to be used for $s_k$ generation. Note that the number of possible {$m_0$, $m_1$} is 31*31=961. There are 168*5=840 elements that may be selected from all possible combinations of {$m_0$, $m_1$}, denoted by {$C_0$, $C_1$, $C_2$, $C_3$, $C_4$} with $C_j$={$c_{j,1}$, $c_{j,2}$, ..., $c_{j,168}$} for subframe group j. A new mapping between {cell ID, subframe group index} and the value of {$m_0$, $m_1$} may be defined: for SSS transmitted in subframe in group j, the value of {$m_0$, $m_1$} can be found from $c_{j,i}$, where i depends on the cell ID. Thus, it is possible to differentiate different subframe groups.

The mathematical form for the generation of M-sequences $s_{k,j}(n)$ with k∈{0, 1}, j=(l mod 5) and l∈{0, 1, ..., 9} being the subframe index is $s_{k,j}(n)=\tilde{s}_k(n+m_k(j))$, where $m_k(j)$ can be obtained from $C_j$.

To differentiate the subframe indexes within each group, a technique similar to the differentiation between Rel-12 SSS in subframes #0 and #5 can be used, where the interleaving order of the scrambled version of $s_0$ and $s_1$ is switched between the two subframes within the same subframe group. In conclusion, the SSS generation approach according to this type of embodiment is extended from the approach of Rel-12 by changing the M-sequences $s_k(n)$ with k∈{0, 1} to $s_{k,j}(n)$ with k∈{0, 1}, j=(l mod 5), and l∈{0, 1, ..., 9} being the subframe index.

Figure 7:
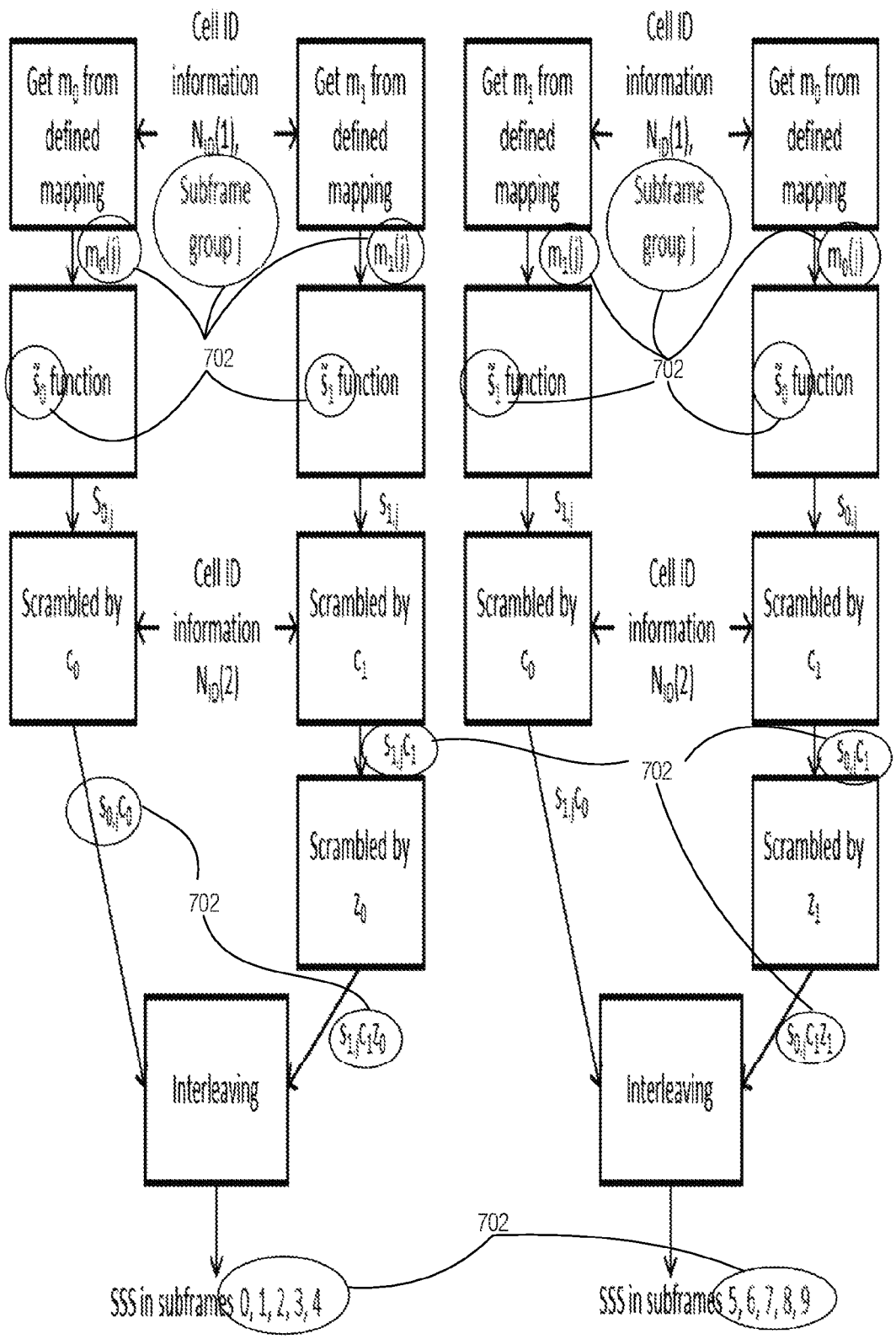
FIG. 7 is a flow diagram illustrating operations in the generation of subframe-dependent SSS according to some embodiments.

FIG. 7 is a flow diagram illustrating operations in the generation of subframe-dependent SSS according to some embodiments. As indicated at 702, M-sequences $s_k$ are modified relative to the legacy process depicted in FIG. 5. The index j in FIG. 6 denotes the index of subframe groups, where j=0, 1, 2, 3, 4 refers to subframe group {0, 5}, {1, 6}, {2, 7}, {3, 8} and {4, 9}, respectively.

In related embodiments, the subframe index information in addition to cell ID can be inserted in the generation of scrambling sequences $c_k$. In Rel-12, the scrambling sequence $c_k$ is generated by a cyclic shift of the M-sequence $\tilde{c}$. Specifically, $c_k(n)=\tilde{c}((n+NID(2)+3\ k)\ mod\ 31)$, with k=0 for sequence in subframe #0 and k=1 for sequence in subframe #5. In one approach, the Rel-12 SSS generation approach is extended to all subframes by implementing a new scrambling sequences $c_l(n)$ with l∈{0, 1, ..., 9}, which is obtained by a cyclic shift of the M-sequence $\tilde{c}(n)$, with the shifting amount not only depending on the cell ID, but also on the subframe index. To illustrate, some embodiments utilizing this approach are as follows.

The subframes may be separated into 5 groups: {0, 5}, {1, 6}, {2, 7}, {3, 8} and {4, 9}. For each group, new scrambling sequences are defined by shifting the M-sequence $\tilde{c}$ with different amounts. Let j denote the index of the above subframe groups. We can define $c_{j,k}(n)=\tilde{c}((n+NID(2)+6j+3\ k)\ mod\ 31)$ as the scrambling sequences to generate SSS transmitted in subframes belonging to group j. As j∈{0, 1, ..., 4} and k∈{0, 1}, we have (6j+3 k)∈{0, 27}. Recalling that NID(2)∈{0, 1, 2}, we have (NID(2)+6j+3 k)∈{0, 29}, which makes the shifted M-sequences $c_{j,k}(n)$ distinguishable for each {j, k}.

Figure 8:
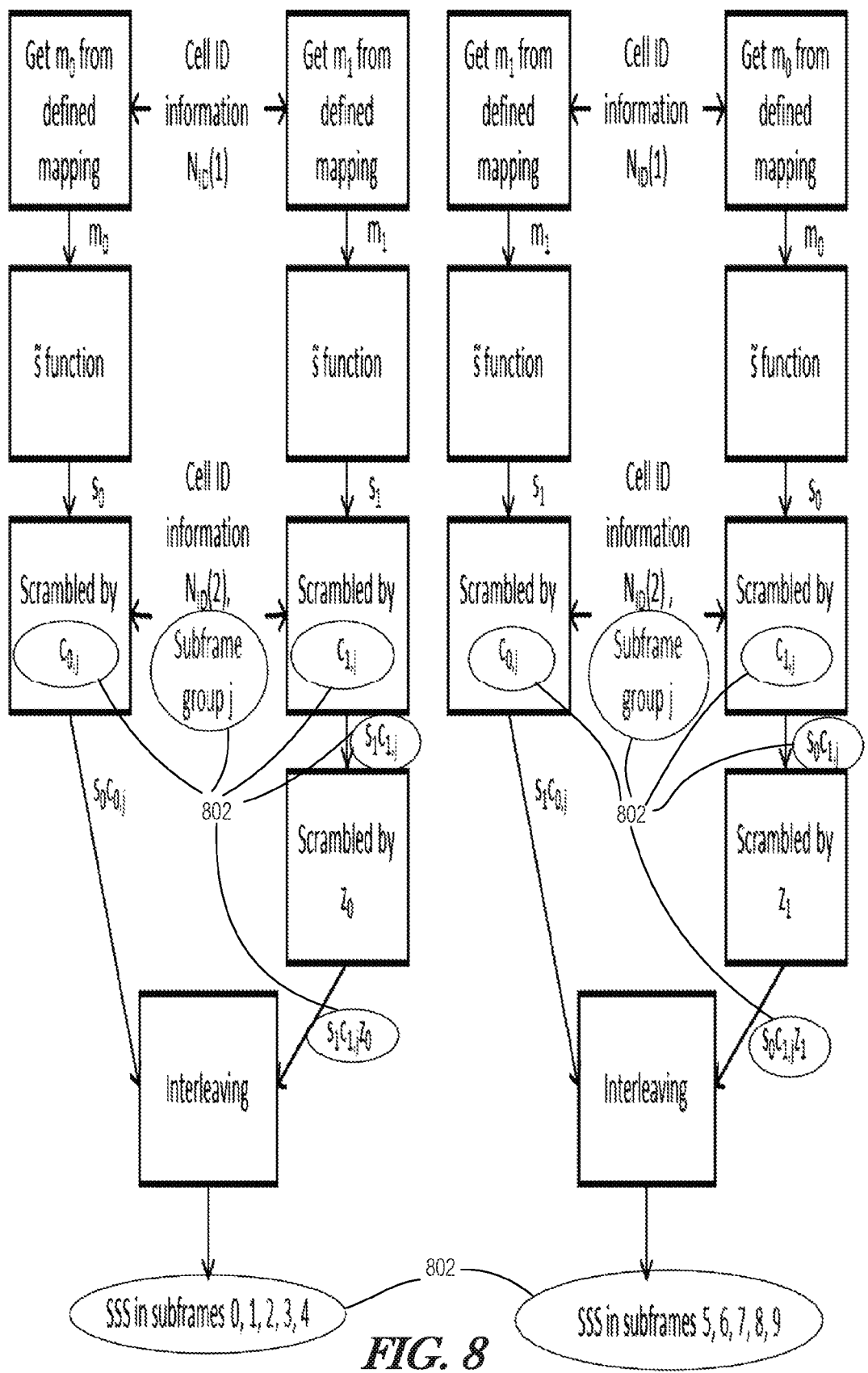
FIG. 8 is a flow diagram illustrating operations in the generation of subframe-dependent SSS according to other embodiments.

In a related subframe-dependent SSS generation approach, the Rel-12 technique is modified in that the scrambling sequences $c_k(n)$ with k∈{0, 1} are changed to $c_{k,j}(n)$ with k∈{0, 1}, j=(l mod 5), and l∈{0, 1, ..., 9} being the subframe index. FIG. 8 is a flow diagram illustrating operations in the generation of subframe-dependent SSS according to some embodiments. The scrambling sequences $c_k$ are modified as indicated at 802 relative to the legacy process depicted in FIG. 5. The index j in FIG. 8 denotes the index of subframe groups, where j=0, 1, 2, 3, 4 refers to subframe group {0, 5}, {1, 6}, {2, 7}, {3, 8} and {4, 9}, respectively.

In some embodiments, SSS for subframes other than #0 and #5 are generated according to one of the two modified SSS generation methods described herein, while the SSS generated for subframes #0 and #5 may be the same as Rel-12 SSS for these two subframes, respectively.

In related embodiments, the SSS may be changed to data symbols, which includes the cell ID information and subframe index information. The number of bits needed to include the cell ID information (504 potential cell ID) and subframe index information (10 subframe indexes) is 9+4=13 bits, which is much smaller than 62 bits if code rate and QPSK are used.

Additional Notes and Examples

Example 1 is apparatus for a secondary-cell E-Node B (eNB), the apparatus comprising: memory; and processing circuitry to control operation of the apparatus in an unlicensed band subject to listen-before-talk (LBT) rules, wherein the processing circuitry is further to: generate a sequence of data that, when transmitted, comprises a secondary-cell discovery reference signal (DRS) that includes a primary synchronization signal (PSS) based on a cell ID associated with the secondary-cell eNB, a secondary synchronization signal (SSS), and a cell-specific reference signal (CRS); and include the secondary-cell DRS in any arbitrary subframe for transmission as part of a radio frame structure; wherein at least one of the SSS and the CRS is generated based on at least one binary sequence associated with the subframe in which the secondary-cell DRS is included In Example 2, the subject matter of Example 1 optionally includes, wherein said any arbitrary subframe corresponds to an idle transmission channel state detected in response to LBT operation of the apparatus.

In Example 3, the subject matter of any one or more of Examples 1-2 optionally include, wherein the at least one of the SSS and CRS is generated to be associated with a range of subframes, wherein the particular subframe in which the secondary-cell DRS is included is within the range.

In Example 4, the subject matter of Example 3 optionally includes, wherein the secondary-cell DRS includes a payload portion, and wherein the payload portion comprises an indicator of a position of the subframe in which the secondary-cell DRS is included within the range of subframes.

In Example 5, the subject matter of any one or more of Examples 3-4 optionally include, wherein the apparatus is to generate a physical broadcast channel (PBCH) transmission that is indicative of a position of the subframe in which the secondary-cell DRS is included within the range of subframes.

In Example 6, the subject matter of any one or more of Examples 1-5 optionally include, wherein the at least one of the SSS and CRS is generated to be associated with a range of subframes from among a total available set of subframes, wherein a first sequence on which the at least one of the SSS and the CRS is based is associated with a first half of the total available set of subframes within a radio frame, and wherein a second sequence on which the at least one of the SSS and the CRS is based is associated with a second half of the total available set of subframes within a radio frame; wherein the secondary-cell DRS is indicative of either the first half or the second half of subframes within a radio frame to which the subframe in which the secondary-cell DRS is included belongs.

In Example 7, the subject matter of any one or more of Examples 1-6 optionally include, wherein the SSS is generated based on the at least one binary sequence associated with the subframe in which the secondary-cell DRS is included, wherein the subframe used for transmission is selected from among X possible subframes according to the radio frame structure, and wherein the at least one binary sequence is selected from among Y available binary sequences, wherein Y is equal to or greater than X.

In Example 8, the subject matter of any one or more of Examples 1-7 optionally include, wherein the SSS is generated based on a combination of at least three maximum-length sequences (M-sequences) and a scrambling sequence, wherein an interleaving of the M-sequences is indicative of the subframe in which the secondary-cell DRS is included.

In Example 9, the subject matter of any one or more of Examples 1-8 optionally include, wherein the SSS is generated based on a combination of at least three maximum-length sequences, wherein at least one of the maximum length sequences is generated based on a primitive polynomial selected from among the group consisting of: $1+x+x^3+x^4+x^5$, $1+x^2+x^3+x^4+x^5$, and $1+x^1+x^2+x^3+x^5$.

In Example 10, the subject matter of any one or more of Examples 1-9 optionally include, wherein the SSS is generated based on a mapping between {subframe index, cell ID} and indices {m0, m1} that are derived from a physical-layer cell identity group, in combination with at least three maximum-length sequences.

In Example 11, the subject matter of any one or more of Examples 1-10 optionally include, wherein the SSS is generated based on a combination of at least two maximum-length sequences (M-sequences) and a scrambling sequence, wherein the scrambling sequence is indicative of the subframe in which the secondary-cell DRS is included.

In Example 12, the subject matter of any one or more of Examples 1-11 optionally include, wherein the SSS is generated based on a combination of at least two maximum-length sequences (M-sequences) and a scrambling sequence, wherein the scrambling sequence is indicative of cell ID information and subframe index information relating to the subframe in which the secondary-cell DRS is included.

In Example 13, the subject matter of any one or more of Examples 1-12 optionally include, wherein the apparatus is integrated in a baseband processor circuit.

In Example 14, the subject matter of any one or more of Examples 1-13 optionally include, wherein the apparatus is a base station.

Example 15 is apparatus for a secondary-cell E-Node B (eNB), the apparatus comprising: memory; and processing circuitry to control operation of the apparatus in an unlicensed band subject to listen-before-talk (LBT) rules, wherein the processing circuitry is further to: generate a sequence of data that, when transmitted, comprises a secondary-cell discovery reference signal (DRS) that includes a primary synchronization signal (PSS) based on a cell ID associated with the secondary-cell eNB, a secondary synchronization signal (SSS), and a cell-specific reference signal (CRS); and include the secondary-cell DRS in a subframe for transmission as part of a radio frame structure; wherein the SSS is generated based on at least one binary sequence unassociated with the subframe in which in which the secondary-cell DRS is included is included In Example 16, the subject matter of Example 15 optionally includes, wherein the CRS is generated based on at least one binary sequence unassociated with the subframe in which the secondary-cell DRS is included.

In Example 17, the subject matter of any one or more of Examples 15-16 optionally include, wherein the secondary-cell DRS includes a channel state information reference signal (CSI-RS) that is generated based on at least one binary sequence unassociated with the subframe in which the secondary-cell DRS is included.

In Example 18, the subject matter of any one or more of Examples 15-17 optionally include, further comprising: a communication interface with a primary-cell eNB; wherein the secondary-cell eNB is to be time-synchronized with the primary-cell eNB via the communication interface, and wherein transmissions from the primary-cell eNB are indicative of the subframe in which the secondary-cell DRS is included.

In Example 19, the subject matter of any one or more of Examples 15-18 optionally include, wherein the secondary-cell DRS includes a payload portion, and wherein the payload portion comprises an indicator of the subframe in which the secondary-cell DRS is included.

In Example 20, the subject matter of any one or more of Examples 15-19 optionally include, wherein the apparatus is to generate a sequence for a physical broadcast channel (PBCH) transmission that is indicative of the subframe in which the secondary-cell DRS is included.

In Example 21, the subject matter of any one or more of Examples 15-20 optionally include, wherein the apparatus is integrated in a baseband processor circuit.

In Example 22, the subject matter of any one or more of Examples 15-21 optionally include, wherein the apparatus is a base station.

Example 23 is a computer-readable medium comprising instructions that, when executed by processing circuitry of an apparatus for a secondary-cell E-Node B (eNB), cause the secondary-cell eNB to: generate messages for transmission in accordance with listen-before-talk (LBT) rules; generate a sequence of data that, when transmitted, comprises a secondary-cell discovery reference signal (DRS) that includes a primary synchronization signal (PSS) based on a cell ID associated with the secondary-cell eNB, a secondary synchronization signal (SSS), and a cell-specific reference signal (CRS); and pass the secondary-cell DRS to transceiver circuitry for transmission in a subframe of a radio frame structure; wherein the SSS is generated based on at least one binary sequence unassociated with the subframe in which the secondary-cell DRS is included In Example 24, the subject matter of Example 23 optionally includes, wherein the CRS is generated based on at least one binary sequence unassociated with the subframe in which the secondary-cell DRS is included.

In Example 25, the subject matter of any one or more of Examples 23-24 optionally include, wherein the secondary-cell DRS includes a channel state information reference signal (CSI-RS) that is generated based on at least one binary sequence unassociated with the subframe in which the secondary-cell DRS is included.

In Example 26, the subject matter of any one or more of Examples 23-25 optionally include, further comprising: instructions for communicatively interfacing with a primary-cell eNB; wherein the secondary-cell eNB is time-synchronized with the primary-cell eNB via the communication interface, and wherein transmissions from the primary-cell eNB are indicative of the subframe in which the secondary-cell DRS is included.

In Example 27, the subject matter of any one or more of Examples 23-26 optionally include, wherein the secondary-cell DRS includes a payload portion, and wherein the payload portion comprises an indicator of the subframe in which the secondary-cell DRS is included.

In Example 28, the subject matter of any one or more of Examples 23-27 optionally include, wherein the instructions are to cause the secondary-cell eNB to generate a physical broadcast channel (PBCH) transmission that is indicative of the subframe in which the secondary-cell DRS is included.

Example 29 is a computer-readable medium comprising instructions that, when executed by processing circuitry of an apparatus for a secondary-cell E-Node B (eNB), cause the secondary-cell eNB to: generate messages for transmission in accordance with listen-before-talk (LBT) rules; generate a sequence of data that, when transmitted, comprises a secondary-cell discovery reference signal (DRS) that includes a primary synchronization signal (PSS) based on a cell ID associated with the secondary-cell eNB, a secondary synchronization signal (SSS), and a cell-specific reference signal (CRS); and control the transceiver circuitry to transmit the secondary-cell DRS in any arbitrary subframe of a radio frame structure; wherein at least one of the SSS and the CRS is generated based on at least one binary sequence associated with the subframe in which the secondary-cell DRS is included In Example 30, the subject matter of Example 29 optionally includes, wherein said any arbitrary subframe corresponds to an idle transmission channel state detected in response to LBT operation of the apparatus.

In Example 31, the subject matter of any one or more of Examples 29-30 optionally include, wherein the at least one of the SSS and CRS is generated to be associated with a range of subframes, wherein the particular subframe in which the secondary-cell DRS is included is within the range.

In Example 32, the subject matter of Example 31 optionally includes, wherein the secondary-cell DRS includes a payload portion, and wherein the payload portion comprises an indicator of a position of the subframe in which the secondary-cell DRS is included within the range of subframes.

In Example 33, the subject matter of any one or more of Examples 31-32 optionally include, wherein the instructions are to cause the secondary-cell eNB to generate a physical broadcast channel (PBCH) transmission that is indicative of a position of the subframe in which the secondary-cell DRS is included within the range of subframes.

In Example 34, the subject matter of any one or more of Examples 29-33 optionally include, wherein the at least one of the SSS and CRS is generated to be associated with a range of subframes from among a total available set of subframes, wherein a first sequence on which the at least one of the SSS and the CRS is based is associated with a first half of the total available set of subframes within a radio frame, and wherein a second sequence on which the at least one of the SSS and the CRS is based is associated with a second half of the total available set of subframes within a radio frame; wherein the secondary-cell DRS is indicative of either the first half or the second half of subframes within a radio frame to which the subframe in which the secondary-cell DRS is included belongs.

In Example 35, the subject matter of any one or more of Examples 29-34 optionally include, wherein the SSS is generated based on the at least one binary sequence associated with the subframe in which the secondary-cell DRS is included, wherein the subframe used for transmission is selected from among X possible subframes according to the radio frame structure, and wherein the at least one binary sequence is selected from among Y available binary sequences, wherein Y is equal to or greater than X.

In Example 36, the subject matter of any one or more of Examples 29-35 optionally include, wherein the SSS is generated based on a combination of at least three maximum-length sequences (M-sequences) and a scrambling sequence, wherein an interleaving of the M-sequences is indicative of the subframe in which the secondary-cell DRS is included.

In Example 37, the subject matter of any one or more of Examples 29-36 optionally include, wherein the SSS is generated based on a combination of at least three maximum-length sequences, wherein at least one of the maximum length sequences is generated based on a primitive polynomial selected from among the group consisting of: $1+x+x^3+x^4+x^5$, $1+x^2+x^3+x^4+x^5$, and $1+x^1+x^2+x^3+x^5$.

In Example 38, the subject matter of any one or more of Examples 29-37 optionally include, wherein the SSS is generated based on a mapping between {subframe index, cell ID} and indices {m0, m1} that are derived from a physical-layer cell identity group, in combination with at least three maximum-length sequences.

In Example 39, the subject matter of any one or more of Examples 29-38 optionally include, wherein the SSS is generated based on a combination of at least two maximum-length sequences (M-sequences) and a scrambling sequence, wherein the scrambling sequence is indicative of the subframe in which the secondary-cell DRS is included.

In Example 40, the subject matter of any one or more of Examples 29-39 optionally include, wherein the SSS is generated based on a combination of at least two maximum-length sequences (M-sequences) and a scrambling sequence, wherein the scrambling sequence is indicative of cell ID information and subframe index information relating to the subframe in which the secondary-cell DRS is included.

Example 41 is apparatus for a secondary-cell E-Node B (eNB), the apparatus comprising: means for storing data; and means for controlling operation of the apparatus in an unlicensed band subject to listen-before-talk (LBT) rules, wherein the means for controlling include: means for generating a sequence of data that, when transmitted, comprises a secondary-cell discovery reference signal (DRS) that includes a primary synchronization signal (PSS) based on a cell ID associated with the secondary-cell eNB, a secondary synchronization signal (SSS), and a cell-specific reference signal (CRS); and means for including the secondary-cell DRS in a subframe for transmission as part of a radio frame structure; wherein the SSS is generated based on at least one binary sequence unassociated with the subframe in which in which the secondary-cell DRS is included is included In Example 42, the subject matter of Example 41 optionally includes, wherein the CRS is generated based on at least one binary sequence unassociated with the subframe in which the secondary-cell DRS is included.

In Example 43, the subject matter of any one or more of Examples 41-42 optionally include, wherein the secondary-cell DRS includes a channel state information reference signal (CSI-RS) that is generated based on at least one binary sequence unassociated with the subframe in which the secondary-cell DRS is included.

In Example 44, the subject matter of any one or more of Examples 41-43 optionally include, further comprising: means for interfacing with a primary-cell eNB; wherein the secondary-cell eNB is to be time-synchronized with the primary-cell eNB via the means for interfacing, and wherein transmissions from the primary-cell eNB are indicative of the subframe in which the secondary-cell DRS is included.

In Example 45, the subject matter of any one or more of Examples 41-44 optionally include, wherein the secondary-cell DRS includes a payload portion, and wherein the payload portion comprises an indicator of the subframe in which the secondary-cell DRS is included.

In Example 46, the subject matter of any one or more of Examples 41-45 optionally include, wherein the apparatus is to generate a sequence for a physical broadcast channel (PBCH) transmission that is indicative of the subframe in which the secondary-cell DRS is included.

In Example 47, the subject matter of any one or more of Examples 41-46 optionally include, wherein the apparatus is integrated in a baseband processor circuit.

In Example 48, the subject matter of any one or more of Examples 41-47 optionally include, wherein the apparatus is a base station.

Example 49 is apparatus for a secondary-cell E-Node B (eNB), the apparatus comprising: means for storing data; and means for controlling operation of the apparatus in an unlicensed band subject to listen-before-talk (LBT) rules, wherein the means for controlling include: means for generating a sequence of data that, when transmitted, comprises a secondary-cell discovery reference signal (DRS) that includes a primary synchronization signal (PSS) based on a cell ID associated with the secondary-cell eNB, a secondary synchronization signal (SSS), and a cell-specific reference signal (CRS); and means for including the secondary-cell DRS in any arbitrary subframe for transmission as part of a radio frame structure; wherein at least one of the SSS and the CRS is generated based on at least one binary sequence associated with the subframe in which the secondary-cell DRS is included In Example 50, the subject matter of Example 49 optionally includes, wherein said any arbitrary subframe corresponds to an idle transmission channel state detected in response to LBT operation of the apparatus.

In Example 51, the subject matter of any one or more of Examples 49-50 optionally include, wherein the at least one of the SSS and CRS is generated to be associated with a range of subframes, wherein the particular subframe in which the secondary-cell DRS is included is within the range.

In Example 52, the subject matter of Example 51 optionally includes, wherein the secondary-cell DRS includes a payload portion, and wherein the payload portion comprises an indicator of a position of the subframe in which the secondary-cell DRS is included within the range of subframes.

In Example 53, the subject matter of any one or more of Examples 51-52 optionally include, wherein the apparatus is to generate a physical broadcast channel (PBCH) transmission that is indicative of a position of the subframe in which the secondary-cell DRS is included within the range of subframes.

In Example 54, the subject matter of any one or more of Examples 49-53 optionally include, wherein the at least one of the SSS and CRS is generated to be associated with a range of subframes from among a total available set of subframes, wherein a first sequence on which the at least one of the SSS and the CRS is based is associated with a first half of the total available set of subframes within a radio frame, and wherein a second sequence on which the at least one of the SSS and the CRS is based is associated with a second half of the total available set of subframes within a radio frame; wherein the secondary-cell DRS is indicative of either the first half or the second half of subframes within a radio frame to which the subframe in which the secondary-cell DRS is included belongs.

In Example 55, the subject matter of any one or more of Examples 49-54 optionally include, wherein the SSS is generated based on the at least one binary sequence associated with the subframe in which the secondary-cell DRS is included, wherein the subframe used for transmission is selected from among X possible subframes according to the radio frame structure, and wherein the at least one binary sequence is selected from among Y available binary sequences, wherein Y is equal to or greater than X.

In Example 56, the subject matter of any one or more of Examples 49-55 optionally include, wherein the SSS is generated based on a combination of at least three maximum-length sequences (M-sequences) and a scrambling sequence, wherein an interleaving of the M-sequences is indicative of the subframe in which the secondary-cell DRS is included.

In Example 57, the subject matter of any one or more of Examples 49-56 optionally include, wherein the SSS is generated based on a combination of at least three maximum-length sequences, wherein at least one of the maximum length sequences is generated based on a primitive polynomial selected from among the group consisting of: $1+x+x^3+x^4+x^5$, $1+x^2+x^3+x^4+x^5$, and $1+x^+x^2+x^3+x^5$.

In Example 58, the subject matter of any one or more of Examples 49-57 optionally include, wherein the SSS is generated based on a mapping between {subframe index, cell ID} and indices {m0, m1} that are derived from a physical-layer cell identity group, in combination with at least three maximum-length sequences.

In Example 59, the subject matter of any one or more of Examples 49-58 optionally include, wherein the SSS is generated based on a combination of at least two maximum-length sequences (M-sequences) and a scrambling sequence, wherein the scrambling sequence is indicative of the subframe in which the secondary-cell DRS is included.

In Example 60, the subject matter of any one or more of Examples 49-59 optionally include, wherein the SSS is generated based on a combination of at least two maximum-length sequences (M-sequences) and a scrambling sequence, wherein the scrambling sequence is indicative of cell ID information and subframe index information relating to the subframe in which the secondary-cell DRS is included.

In Example 61, the subject matter of any one or more of Examples 49-60 optionally include, wherein the apparatus is integrated in a baseband processor circuit.

In Example 62, the subject matter of any one or more of Examples 49-61 optionally include, wherein the apparatus is a base station.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus for a base station, the base station configured for Licensed-Assisted Access (LAA) to operate in an unlicensed band and apply Listen-Before Talk (LBT) before performing a transmission in the unlicensed band, the apparatus comprising:

a processor to configure the base station for secondary cell operation in the unlicensed band, wherein as part of the secondary cell operation, the processor is configured to cause the base station to:

generate a length-62 sequence for a secondary synchronization signal (SSS), the length-62 sequence comprising an interleaved combination of two length-31 binary sequences, wherein the SSS is part of a discovery reference signal (DRS), wherein the DRS is less than 1 ms in width, wherein to generate the length-62 sequence, the processor is configured to cause the base station to:

scramble a first length-31 binary sequence s0 with a scrambling sequence c0, to generate a scrambled sequence s0c0;

scramble the sequence s0 with a scrambling sequence c1 and a first z1 scrambling sequence, to generate a scrambled sequence s0c1z1;

scramble a second length-31 binary sequence s1 with the scrambling sequence c0, to generate a scrambled sequence s1c0;

scramble the sequence s1 with the scrambling sequence c1 and a second z1 scrambling sequence, to generate a scrambled sequence s1c1z1;

for transmission of the SSS in any of subframes 0, 1, 2, 3, and 4 of a radio frame, interleave the scrambled sequence s0c0 with the scrambled sequence s1c1z1, wherein the scrambled sequence s0c0 resides in even positions of the length-62 sequence characterized by function d(2n), and the scrambled sequence s1c1z1 resides in odd positions of the length-62 sequence characterized by function d(2n+1);

for transmission of the SSS in any of subframes 5, 6, 7, 8, and 9 of the radio frame, interleave the scrambled sequence s1c0 with the scrambled sequence s0c1z1, wherein the scrambled sequence s1c0 resides in even positions of the length-62 sequence characterized by the function d(2n), and the scrambled sequence s0c1z1 resides in odd positions of the length-62 sequence characterized by the function d(2n+1);

select any one subframe group of a plurality of subframe groups, the plurality of subframe groups including {0, 5}, {1, 6}, {2, 7}, {3, 8} and {4, 9}, wherein respective subframe groups include two subframes of the radio frame and are associated with respective values of a subframe group index j, wherein the scrambling sequence c0 and the scrambling sequence c1 are different for different values of the subframe group index j;

transmit the length-62 sequence as the SSS in two subframes of any one of the subframe groups; and store the sequence s0 and the sequence s1, and wherein n in the functions d(2n) and d(2n+1) includes all values from 0 to 30.

2. The apparatus of claim 1, wherein the interleaving order of the sequence s0 and the sequence s1 differs between the subframes 0, 1, 2, 3, and 4 and the subframes 5, 6, 7, 8, and 9.

3. The apparatus of claim 2, wherein the processor is further configured to generate signaling to configure transceiver circuitry to sense the unlicensed band to be idle for a duration.

4. The apparatus of claim 3, wherein the processor is further configured to:

generate signaling to configure the transceiver circuitry to transmit, in the unlicensed band, the length-62 sequence as the SSS in two subframes of any one of the subframe groups of the radio frame if the unlicensed band is sensed to be idle during the duration.

5. The apparatus of claim 2, wherein the interleaving order of the sequence s0 and the sequence s1 alternates between the subframes 0, 1, 2, 3, and 4 and the subframes 5, 6, 7, 8, and 9.

6. The apparatus of claim 1, wherein the sequences s0 and s1, the first z1 scrambling sequence, and the second z1 scrambling sequence, are defined according to indices m0 and m1, and scrambling sequences c0 and c1 are defined according to a physical-layer cell identity group NID-(2).

7. The apparatus of claim 1, wherein the sequence s0 and the sequence s1 are defined by a different cyclic shift of a first maximum-length sequence (m-sequence), wherein the scrambling sequence c0 and the scrambling sequence c1 are defined by a different cyclic shift of a second m-sequence, and wherein the first z1 scrambling sequence and the second z1 scrambling sequence are defined by a different cyclic shift of a third m-sequence.

8. The apparatus of claim 1, wherein the unlicensed band is a standalone unlicensed band.

9. An apparatus of a user equipment (UE) configured for Licensed-Assisted Access (LAA) to operate in an unlicensed band, the apparatus comprising:
a processor to configure the UE for an operation with a secondary cell in the unlicensed band, wherein as part of the operation, the processor is configured to cause the UE to:
perform Listen-Before Talk (LBT) before a transmission in the unlicensed band; and
receive a length-62 sequence as a secondary synchronization signal (SSS) in two subframes of any one subframe group of a plurality of subframe groups, the plurality of subframe groups including {0, 5}, {1, 6}, {2, 7}, {3, 8} and {4, 9}, wherein respective subframe groups include two subframes of a radio frame and are associated with respective values of a subframe group index j,
wherein the SSS is part of a discovery reference signal (DRS), wherein the DRS is less than 1 ms in width,
wherein for reception of the SSS in any of subframes 0, 1, 2, 3, and 4 of the radio frame, the processor is configured to deinterleave a scrambled sequence s0c0 with a scrambled sequence s1c1z1, wherein the scrambled sequence s0c0 resides in even positions of a length-62 sequence characterized by function d(2n), and the scrambled sequence s1c1z1 resides in odd positions of the length-62 sequence characterized by function d(2n+1),
wherein for reception of the SSS in any of subframes 5, 6, 7, 8, and 9 of the radio frame, the processor is configured to deinterleave the scrambled sequence s1c0 with the scrambled sequence s0c1z1, wherein the scrambled sequence s1c0 resides in even positions of the length-62 sequence characterized by function d(2n), and the scrambled sequence s0c1z1 resides in odd positions of the length-62 sequence characterized by function d(2n+1),
wherein c0 and c1 are based on the subframe group index j so that different c0 and c1 are associated with different values of subframe group index j.

10. The apparatus of claim 9, wherein the SSS is received following a duration in which the unlicensed band is sensed to be idle.

11. The apparatus of claim 9, wherein the unlicensed band is a standalone unlicensed band.

12. A computer-readable hardware storage device that stores instructions for execution by one or more processors of a base station, the base station configured for Licensed-Assisted Access (LAA) to operate in an unlicensed band and apply Listen-Before Talk (LBT) before performing a transmission in the unlicensed band, the instructions to configure the one or more processors to:
configure the base station for secondary cell operation in the unlicensed band, wherein as part of the secondary cell operation, the instructions are to configure the one or more processors to: generate a length-62 sequence for a secondary synchronization signal (SSS), the length-62 sequence comprising an interleaved combination of two length-31 binary sequences, wherein the SSS is part of a discovery reference signal (DRS), wherein the DRS is less than 1 ms in time, wherein to generate the length-62 sequence, the instructions are to configure the one or more processors to:
scramble a first length-31 binary sequence s0 with a scrambling sequence c0, to generate a scrambled sequence s0c0;
scramble the sequence s0 with a scrambling sequence c1 and a first z1 scrambling sequence, to generate a scrambled sequence s0c1z1;
scramble a second length-31 binary sequence s1 with the scrambling sequence c0, to generate a scrambled sequence s1c0;
scramble the sequence s1 with the scrambling sequence c1 and a second z1 scrambling sequence, to generate a scrambled sequence s1c1z1;
for transmission of the SSS in any of subframes 0, 1, 2, 3, and 4 of a radio frame, interleave the scrambled sequence s0c0 with the scrambled sequence s1c1z1, wherein the scrambled sequence s0c0 resides in even positions of the length-62 sequence characterized by function d(2n), and the scrambled sequence s1c1z1 resides in odd positions d(2n+1) of the length-62 sequence characterized by function d(2n+1);
for transmission of the SSS in any of subframes 5, 6, 7, 8, and 9 of the radio frame, interleave the scrambled sequence s1c0 with the scrambled sequence s0c1z1, wherein the scrambled sequence s1c0 resides in even positions of the length-62 sequence characterized by function d(2n), and the scrambled sequence s0c1z1 resides in odd positions d(2n+1) of the length-62 sequence characterized by function d(2n+1);
select any one subframe group of a plurality of subframe groups, the plurality of subframe groups including {0, 5}, {1, 6}, {2, 7}, {3, 8} and {4, 9}, wherein respective subframe groups include two subframes of the radio frame and are associated with respective values of a subframe group index j, wherein the scrambling sequence c0 and the scrambling sequence c1 are based on the subframe group index j so that different c0 and c1 are associated with different values of subframe group index j; and
transmit the length-62 sequence as the SSS in two subframes of any one of the subframe groups, wherein n in the functions d(2n) and d(2n+1) includes all values from 0 to 30.

13. The computer-readable hardware storage device of claim 12, wherein the interleaving order of the sequence s0 and the sequence s1 differs between the subframes 0, 1, 2, 3, and 4 and the subframes 5, 6, 7, 8, and 9.

14. The computer-readable hardware storage device of claim 13, wherein the instructions are to configure the one or more processors to generate signaling to configure transceiver circuitry to sense the unlicensed band to be idle for a duration.

15. The computer-readable hardware storage device of claim 14, wherein the instructions are to configure the one or more processors to:
generate signaling to configure the transceiver circuitry to transmit, in the unlicensed band, the length-62 sequence as the SSS in two subframes of any one of the subframe groups of the radio frame if the unlicensed band is sensed to be idle during the duration.

16. The computer-readable hardware storage device of claim 13, wherein the interleaving order of the sequence s0 and the sequence s1 alternates between the subframes 0, 1, 2, 3, and 4 and the subframes 5, 6, 7, 8, and 9.

17. The computer-readable hardware storage device of claim 12, wherein the sequences s0 and s1, the first z1 scrambling sequence, and the second z1 scrambling sequence, are defined according to indices m0 and m1, and scrambling sequences c0 and c1 are defined according to a physical-layer cell identity group NID-(2).

18. The computer-readable hardware storage device of claim 12, wherein the sequence s0 and the sequence s1 are defined by a different cyclic shift of a first maximum-length sequence (m-sequence), wherein the scrambling sequence c0 and the scrambling sequence c1 are defined by a different cyclic shift of a second m-sequence, and wherein the first z1 scrambling sequence and the second z1 scrambling sequence are defined by a different cyclic shift of a third m-sequence.

19. The computer-readable hardware storage device of claim 12, wherein the unlicensed band is a stand-alone unlicensed band.

20. A computer-readable hardware storage device that stores instructions for execution by one or more processors of a user equipment (UE) configured for Licensed-Assisted Access (LAA) operation in an unlicensed band, the instructions to configure the UE to:
   perform Listen-Before Talk (LBT) before a transmission in the unlicensed band; and
   communicate with a secondary cell in the unlicensed band, wherein as part of the communication, the instructions are to configure the UE to:
      receive a length-62 sequence as a secondary synchronization signal (SSS) in two subframes of any one subframe group of a plurality of subframe groups, the plurality of subframe groups including {0, 5}, {1, 6}, {2, 7}, {3, 8} and {4, 9}, wherein respective subframe groups include two subframes of a radio frame and are associated with respective values of a subframe group index j,
   wherein the SSS is part of a discovery reference signal (DRS), wherein the DRS is less than 1 ms in width,
   wherein for reception of the SSS in any of subframes 0, 1, 2, 3, and 4 of the radio frame, the one or more processors is configured to deinterleave a scrambled sequence s0c0 with a scrambled sequence s1c1z1, wherein the scrambled sequence s0c0 resides in even positions of a length-62 sequence characterized by function d(2n), and the scrambled sequence s1c1z1 resides in odd positions of the length-62 sequence characterized by function d(2n+1),
   wherein for reception of the SSS in any of subframes 5, 6, 7, 8, and 9 of the radio frame, the one or more processors is configured to deinterleave the scrambled sequence s1c0 with the scrambled sequence s0c1z1, wherein the scrambled sequence s1c0 resides in even positions of the length-62 sequence characterized by function d(2n), and the scrambled sequence s0c1z1 resides in odd positions of the length-62 sequence characterized by function d(2n+1), wherein c0 and c1 are are different for different values of the subframe group index j.

\* \* \* \* \*